United States Patent [19]

Shaw

[11] 4,346,725
[45] Aug. 31, 1982

[54] TRICYCLE CANOPY

[76] Inventor: Leon L. Shaw, 1811 W. Prince Rd., Sp. 7, Tucson, Ariz. 85705

[21] Appl. No.: 119,633

[22] Filed: Feb. 7, 1980

[51] Int. Cl.³ ............................................. B62J 17/08
[52] U.S. Cl. ...................................................... 135/7
[58] Field of Search ............................ 135/7; 280/202

[56] References Cited

U.S. PATENT DOCUMENTS

| 490,229 | 1/1893 | Hohenstein et al. | 135/7 |
| 550,709 | 12/1895 | Dietrich et al. | 135/7 |
| 578,783 | 3/1897 | Sturll | 135/7 |
| 601,977 | 4/1898 | McDonald | 135/7 |
| 690,342 | 12/1901 | Anderson | 135/7 |
| 691,964 | 1/1902 | Olding | 135/7 |
| 988,349 | 4/1911 | Jolley | 135/7 |
| 1,254,858 | 1/1918 | Shmelstein | 135/7 |
| 3,256,034 | 6/1966 | Condray | 135/7 X |

FOREIGN PATENT DOCUMENTS 508450 9/1930 Fed. Rep. of Germany .......... 135/7

Primary Examiner—J. Karl Bell
Attorney, Agent, or Firm—Cahill, Sutton & Thomas

[57] ABSTRACT

A tricycle canopy includes a flexible cover removeably attached to a rectangular cover support frame of light metal tube material. Four rigid prongs are attached to the cover support frame and extend downward perpendicularly from the frame. Two tubular uprights lying in a plane perpendicular to the forward direction of travel of the tricycle are integral with and are supported by a horizontal front member rigidly clamped to the tricycle framehead. The upper ends of the tubular front supports receive two of the prongs extending downward from the side members of the cover support frame. First and second rear uprights have lower ends attached to a support frame for a rear basket attached to the tricycle. The upper ends of the rear uprights receive the other two prongs extending downward from the cover support frame.

4 Claims, 5 Drawing Figures

U.S. Patent  Aug. 31, 1982  4,346,725
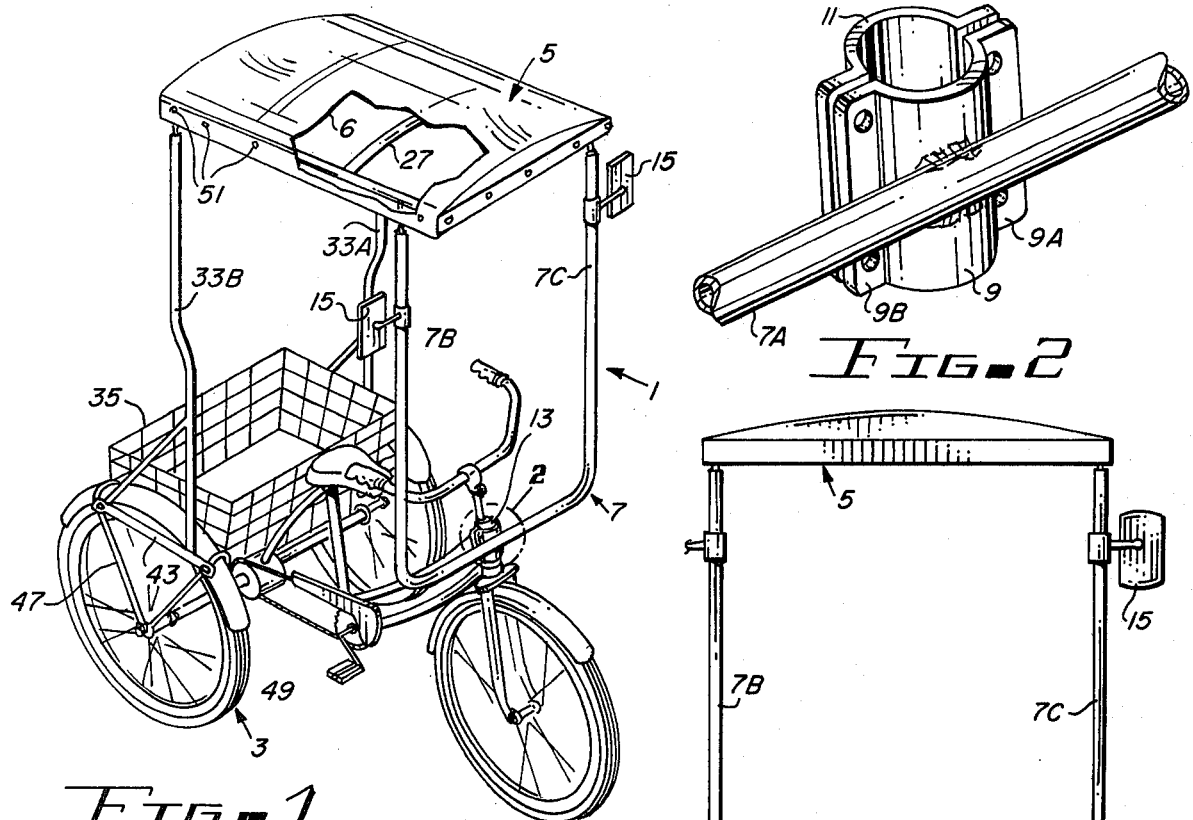
FIG. 1
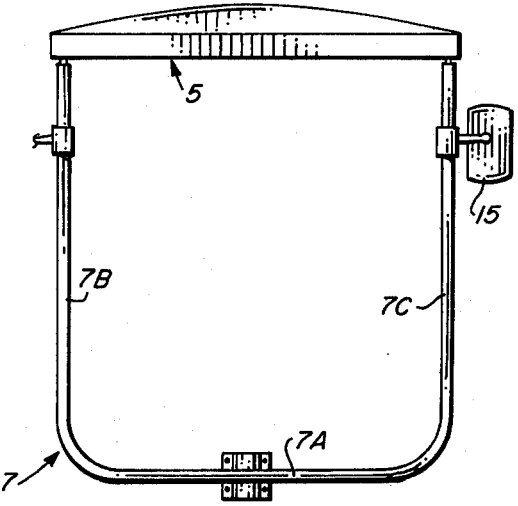
FIG. 2
FIG. 3
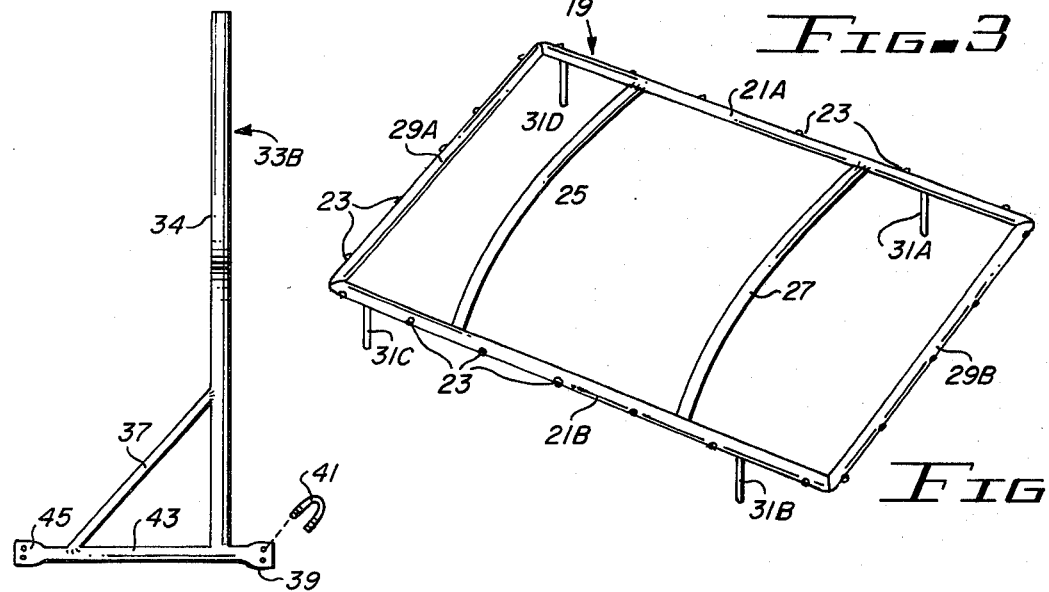
FIG. 4
FIG. 5

TRICYCLE CANOPY

DESCRIPTION OF THE PRIOR ART

Various canopy assemblies have been proposed for use on bicycles and on tricycles to shelter riders from sun and weather. For example, U.S. Pat. No. 691,964 discloses a canopy for a tricycle. U.S. Pat. Nos. 579,812; 601,997; 690,342; 972,063; 1,254,858; 988,349; 597,845 and 3,256,034 all disclose various canopy assemblies for bicycles or motorcycles. None of the canopy assemblies shown in the foregoing patents is suitable for attachment to modern tricycles which are commonly utilized, especially by elderly persons, for exercise or for performing errands which require short amounts of travel and carrying of small amounts of materials, such as one or two bags of groceries. Many tricycles which are commercially available are equipped with a rear mounted basket which is attached to the tricycle frame and is supported by braces which loop over the rear fenders of the tricycle and are attached to the tricycle axle. In certain parts of the United States, especially the southwestern portion, many retired people like to ride such tricycles during most of the year. The summers are intensely hot, and are characterized by frequent thunderstorms and gusty winds which at times thwart riding of the tricycles. Thus, there is an unmet need for a tricycle canopy assembly which will allow safe and comfortable riding of tricycles during extremely hot weather and during relatively windy and/or rainy weather.

Accordingly, it is an object of the invention to provide a tricycle canopy assembly which can be safely and comfortably utilized by persons, especially elderly persons, to provide them with shade from intense sun and shelter from rains without danger of being upset by moderate winds.

It is another object of the invention to provide a tricycle canopy assembly having a removable cover which can be easily removed by an elderly person.

It is important that any tricycle canopy assembly which satisfies the foregoing unmet need to both rigid (for safety reasons) and very light in weight, since the tricycles themselves are quite heavy and it is desirable to minimise overall weight of the tricycle and canopy assembly to minimize exertion required to pedal the tricycle.

Accordingly, another object of the invention is to provide a lightweight, rigid, safe tricycle canopy assembly.

BACKGROUND OF THE INVENTION

Briefly described, and in accordance with one embodiment thereof, the invention provides a lightweight tricycle canopy assembly having a flexible cover removeably fastened to a horizontal tubular cover support frame. Four rigid prongs extending downward from the side members of the cover support frame are received by four respective tubular uprights, including two front uprights which lie in a plane perpendicular to the forward direction of travel of the tricycle and two rear uprights which are attached to rear axle mounted supports, such as basket frame supports which support a basket mounted at the rear of the tricycle. The front uprights are integral with a horizontal front member which is clamped by means of a pair of half collar elements each having a pair of rigid side flanges. The half collar members are drawn together by bolts extending through the flanges to fasten the front horizontal member to the framehead of the tricycle. The lower ends of the rear uprights have horizontal members rigidly attached thereto. Four U-bolts are utilized to attach the ends of the lower rear horizontal members to the rear axle mounted supports.

BRIEF DESCRIPTION OF THE DRAWINGS

FIG. 1 is a perspective view of one embodiment of the invention.

FIG. 2 is an enlarged perspective view of detail 2 of FIG. 1.

FIG. 3 is a plan view of the front canopy support and canopy of the embodiment of the invention shown in FIG. 1.

FIG. 4 is a plan view of a rear canopy support member of the embodiment of the invention shown in FIG. 1.

FIG. 5 is a perspective view of the canopy frame of the embodiment of the invention shown in FIG. 1.

DESCRIPTION OF THE INVENTION

Referring now to the drawings and particularly to FIG. 1, a canopy 1 is provided for a tricycle 3, commonly referred to as a three-wheeled bicycle. Canopy assembly 1 includes a front support 7 and two rear supports 33A and 33B supporting a canopy 5.

Canopy 5 includes a canopy cover 6 supported by a canopy frame 19, shown in detail in FIG. 5.

Referring now to FIG. 5, canopy frame 19 includes two tubular side members 21A and 21B and two tubular end members 29A and 29B. Side members 21A and 21B and end members 25 and 27 are arched upward, and extend between and are vertical with respects to side members 21A and 21B. Cross members 25 and 27 may have a radius of curvature of approximately eight feet, and arch upward in order to produce an outwardly convex curvature for canopy cover 6.

Canopy frame 19 includes a plurality of male snap fastener elements 23 attached to the outer peripheral surfaces of side members 21A and 21B and end members 29A and 29B for engaging corresponding female snap fastener elements 51 attached to the peripheral edges of canopy cover 6.

Referring now to FIGS. 2 and 3, front support member 7 includes a horizontal member 7A and two vertical members 7B and 7C which are continuous with horizontal member 7A. Front support member 7 is formed of a continuous piece of tubular metal which is rigidly attached to a first collar member 9. Collar member 9 has two side flanges 9A and 9B each having a pair of bolt holes therein. A mating collar member 11 which is asymmetrical with collar member 9 is aligned with collar member 9, and is attached thereto by means of bolts (not shown) to rigidly fasten front support 7 to the neck 13 or frame head of tricycle 3 through which the front fork assembly extends. Front uprights 7B and 7C are spaced sufficiently far apart to avoid any interference thereby with the handlebars of bicycle 3 or with the arms or hands of the rider.

A pair of rear view mirrors 15 are attached to uprights 7B and 7C, as shown in FIG. 1. Other accessories, such as reflectors or headlights (not shown) can also be attached to upright members 7C and 7D.

Referring now to FIG. 5, it is seen that canopy frame 19 includes four vertical prongs 31A, 31B and 31D rigidly attached to and extending down from canopy frame 19. These prongs are vertical to the plane of canopy frame 19, and have a diameter slightly smaller than the inside diameters of front tubular uprights 7B and 7C and rear supports 33A and 33B and fit therein when canopy 5 is installed, as shown in FIG. 1.

Rear member 33B is shown in detail in FIG. 4 and includes tubular upright 34, bottom horizontal member 43, and brace 37. Horizontal member 43 has two flatened end flanges each having a pair of holes therein for receiving a U-bolt such as 41. Rear member 33A is entirely similar in construction. More particularly, lower member 43 has flattened flanges 45 and 39 which are utilized in conjunction with U-bolts such as 41 to rigidly attach rear support 33B to a pair of axel mounted support members 49.

Axel mounted support elements 47 and 49 can be of the type commonly utilized to support a wire basket 35 on tricycles of the type shown in FIG. 1.

Diagonal member 37 is rigidly attached to upright 35 and horizontal member 43 as shown in FIG. 4 to provide rigid bracing.

The canopy top material 6 can be made of canvas or flexible plastic material such as vinyl. Canopy top 6 can be easily removed from canopy frame 19 so that the user can quickly remove canopy cover 6 if unexpected dangerous wind conditions develop while he is riding tricycle 3.

The tubular members of which front support 7 and rear supports 33A and 33B are formed and also the tubular members of which canopy frame 19 is formed are preferably light weight but strong metal tubing such as aluminum or aluminum alloy tube material. The described embodiment of the invention is easily assembled from a kit and is easily installed on most commercially available tricycles. The low cross sectional area both from the front and the side directions results in a canopy structure which presents very little wind resistance, and is therefore safe for elderly users even in the presence of fairly brisk winds. The tricycle canopy arrangement has been found to be very satisfactory for providing protection both against sun and rain, and enables elderly persons who could not otherwise safely ride a bicycle or tricycle to do so despite adverse weather conditions such as rain or extremely intense sun.

While the invention has been described with respect to a particular embodiment thereof, those skilled in the art will recognize that variations in the described structure can be readily provided by those skilled in the art without departing from the true spirit and scope of the invention, as set forth in the appended claims.

I claim:
1. A tricycle canopy comprising in combination:
a flexible cover for extending approximately from the front to the rear of a tricycle to shelter or shade a rider thereof;
a horizontal cover support frame for supporting said flexible cover wherein said cover support frame includes a pair of opposed substantially horizontal side members, a pair of opposed substantially horizontal end members rigidly attached to the respective ends of said side members, and a plurality of arched cross members rigidly attached to and extending between said pair of side members for producing a curved upper surface of said flexible cover, said horizontal side members lying in a plane;
means for fastening the periphery of said flexible cover to the periphery of said cover support frame, said fastening means including a plurality of snap fastener elements rigidly attached to the periphery of said cover support frame and a plurality of corresponding mating snap fastener elements attached to peripheral edge portions of said flexible cover for effecting taut fastening of said flexible cover to said cover support frame to enable the operator to easily attach the flexible cover to or remove the flexible cover from said cover support frame;
first and second front uprights lying in a plane perpendicular to the forward direction of travel of the tricycle, said first and second front uprights being spaced sufficiently far apart to prevent any interference of said first and second front uprights with handlebars of the tricycle or with the hands or arms of the operator of the tricycle, said first and second front uprights being composed of lightweight tubular material;
a horizontal front member for supporting said first and second front uprights, said horizontal member being integral with said first and second front uprights, said horizontal member being centrally rigidly attached to the frame head of the tricycle to rigidly support the first and second uprights;
clamping means rigidly attached to said horizontal member for clamping said horizontal member rigidly to the frame head of the tricycle;
first and second spaced rear uprights for rigid attachment to a first end portion of said tricycle, respectively, said first and second portions being respectively located approximately adjacent to opposed ends of the rear axle of the tricycle where said first and second front uprights, said horizontal front member, said first and second rear uprights, and said cover support frame are all formed of lightweight metal tube material; and
first, second, third and fourth prongs each having and upper end and a lower end, the upper end of each of said prongs being rigidly attached only to said cover support frame, said first, second, third and fourth prongs extending vertically downward from the plane of said cover support frame and extending into and being rigidly, directly attached to the upper end portions of said first and second front uprights and said first and second rear uprights, respectively, said upper end portions of said first and second front uprights and said first and second rear uprights being attached only to said first, second, third and fourth prongs, respectively, the lower portions of said first, second, third and fourth prongs being attached only to said upper end portions of said first and second front uprights and said first and second rear uprights, respectively, the upper end portions of said first and second front uprights and said first and second rear uprights being vertical, said attachment of said prongs to said cover support frame being sufficiently rigid to prevent sideways, forward, and backward tilting of said first and second front uprights and said first and second rear uprights due to moderate wind forces on said flexible cover when said flexible cover is fastened to said cover support frame;
whereby said flexible cover can be easily removed from said cover support frame if a rider encounters dangerous wind conditions while he is riding the tricycle.

2. The tricycle canopy assembly of claim 1 wherein said clamping means includes first and second half collar elements each having a pair of rigid flanges thereof, each of said flanges having a plurality of bolt holes therein, said first and second half collar elements being disposed on opposite sides of the frame head of the tricycle and rigidly clamped thereto by means of bolts extending through the bolt holes, said first half collar element being rigidly attached to said horizontal front member.

3. The tricycle canopy assembly of claim 2 wherein the tricycle includes axle mounted brace means rigidly attached to the axle and frame of the tricycle for supporting a basket, said first and second rear uprights each having attached to its lower end a horizontal member and also including a brace member for rigidly maintaining said horizontal member perpendicular to that rear upright.

4. The tricycle canopy assembly of claim 3 wherein each of said horizontal members attached to said respective rear uprights includes a pair of opposed flanges having a pair of holes therein, a U-bolt extending through each pair of holes to fasten the horizontal member to said axle mounted brace means.

* * * * *